United States Patent [19]

Bahl et al.

[11] Patent Number: 4,819,271
[45] Date of Patent: Apr. 4, 1989

[54] CONSTRUCTING MARKOV MODEL WORD BASEFORMS FROM MULTIPLE UTTERANCES BY CONCATENATING MODEL SEQUENCES FOR WORD SEGMENTS

[75] Inventors: Lalit R. Bahl, Amawalk; Peter V. DeSouza; Robert L. Mercer, both of Yorktown Heights; Michael A. Picheny, White Plains, all of N.Y.

[73] Assignee: International Business Machines Corporation, Armonk, N.Y.

[21] Appl. No.: 133,719

[22] Filed: Dec. 16, 1987

Related U.S. Application Data

[63] Continuation-in-part of Ser. No. 738,933, May 29, 1985, Pat. No. 4,759,068.

[51] Int. Cl.[4] ............................................. G10L 5/00
[52] U.S. Cl. .................................................... 381/43
[58] Field of Search ................................. 381/41—43; 364/513.5

[56] References Cited

U.S. PATENT DOCUMENTS 4,587,670   5/1986   Levinson ............................. 381/43

*Primary Examiner*—Emanuel S. Kemeny
*Attorney, Agent, or Firm*—Marc A. Block

[57] ABSTRACT

The present invention relates to apparatus and method for segmenting multiple utterances of a vocabulary word in a consistent and coherent manner and determining a Markov model sequence for each segment. A fenemic Markov model corresponds to each label.

18 Claims, 10 Drawing Sheets

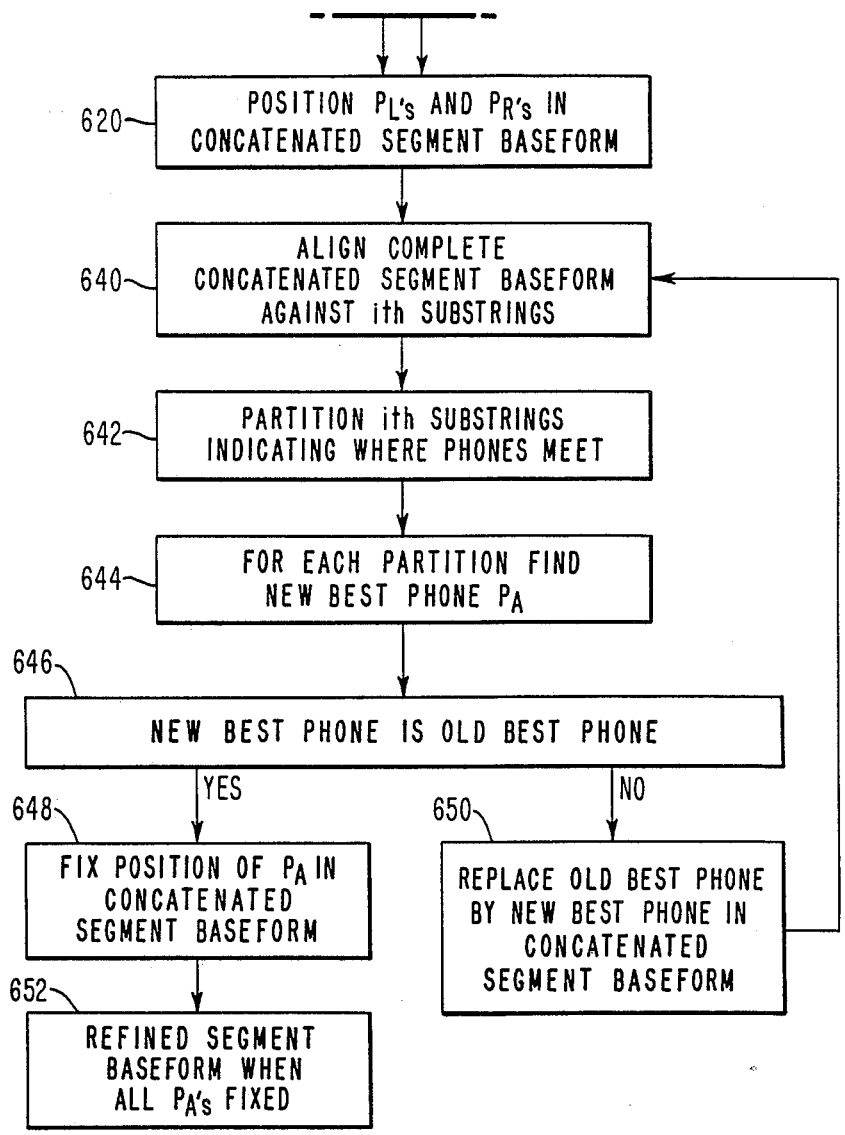
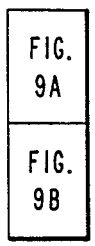
FIG. 9B
FIG. 9

CONSTRUCTING MARKOV MODEL WORD BASEFORMS FROM MULTIPLE UTTERANCES BY CONCATENATING MODEL SEQUENCES FOR WORD SEGMENTS

RELATED APPLICATIONS

The present application is a continuation-in-part application of a co-pending patent application entitled "Constructing Markov Models of Words from Multiple Utterances", invented by the same inventors herein and also owned by the IBM Corporation, U.S. Ser. No. 738,933, filed on May 29, 1985 now U.S. Pat. No. 4,759,068, issued July 19, 1988.

BACKGROUND OF THE INVENTION

I. Field of the Invention

The present invention relates to speech processing, such as speech recognition, in which each of a plurality of vocabulary words is to be represented and stored in a computer memory as a word baseform constructed of a sequence of Markov models.

II. Description of the Problem

In speech recognition, the use of Markov models has been suggested. In performing Markov model speech recognition, one essential step is characterizing each word in a vocabulary as a respective sequence of Markov models.

In the prior art, each Markov model normally represents a phoneme, or phonetic element. A human phonetician, based on his/her expertise and senses, defines each vocabulary word as a respective sequence of phonetic elements. The Markov models associated with the sequential phonetic elements are concatenated to form a phonetic word baseform. In FIG. 1, a phonetic word baseform 100 is shown for the word "THE" to include a sequence of three phonetic Markov models: a first for the phonetic element DH, a second for the phonetic element UH1, and a third for the phonetic element XX. An International Phonetic Alphabet lists standard phonetic elements.

Each of the three phonetic Markov models are shown having an initial state and a final state and a plurality of states in between, and a plurality of arcs each of which extends from a state to a state. During a training stage, a probability is determined for each arc and for non-null arcs (represented with solid lines) label output probabilities are determined. Each label output probability corresponds to the likelihood of a label being produced at a given arc when the arc is followed. In earlier Markov model speech recognizer systems, such as that described in the co-pending, allowed patent application entitled "Speech Recognition System" by Bahl et al., Ser. No. 845,155 filed Mar. 27, 1986 now U.S. Pat. No. 4,718,094, issued Jan. 5, 1988—which is commonly owned with the present application and is incorporated by reference—each word in the vocabulary is represented by a sequence of phonetic Markov models like those illustrated in FIG. 1. During recognition, an acoustic processor generates a string of labels in response to a speech utterance. Based on the various paths the string of labels can take through the sequence of phonetic Markov models for each word and the probabilities of following arcs and producing labels thereat, the likelihood of the Markov model sequence for each word producing the string of labels is determined.

There are a number of problems with the phonetic Markov model approach. First, the sequence of phonetic Markov models for each word is greatly dependent on the expertise and senses of the phonetician. From one phonetician to another, the sequence of Markov models associated with a given word may vary. Second, the Markov model associated with a phonetic element is relatively complex. Computations required in recognizing speech based on the phonetic Markov models can be considerable. And third, the accuracy of recognizing uttered words based solely on phonetic Markov models is not optimal.

A partial solution to the above-noted problems includes performing an approximate acoustic match to all words in order to produce a short list of candidate words. Each of the candidate words is then processed in a detailed acoustic match. By reducing the number of words that must be processed in detail, computational savings are achieved. This approach has been discussed in the aforementioned patent application entitled "Speech Recognition System".

To enhance accuracy and to address the phonetician-dependence problem, recognition of speech based on a different type of Markov model has been suggested. To illustrate the different type of Markov model, it is observed that a Markov model speech recognition system typically includes an acoustic processor which converts an acoustic waveform (speech input) into a string of labels. The labels in the string are selected from an alphabet of labels, wherein each label corresponds to a defined cluster of vectors in an r-dimensional space which defines all speech. For each interval of time, the acoustic processor examines r—on the order of twenty—characteristics of speech (e.g., energy amplitudes at twenty respective frequency bands). Based on the values of the r characteristics, an r-component "feature vector" is defined. A selection is made as to which of plural exclusive clusters (for example 200 clusters) the feature vector belongs in. Each cluster is identified with a respective label. For each interval of time, a feature vector is generated by the acoustic processor; the cluster into which the feature vector belongs is determined; and the label for that cluster is associated with the time interval. The acoustic processor thus produces as output a string of labels.

The aforementioned different type of Markov model relates to labels rather than phonetic elements. That is, for each label there is a Markov model. Where the term "feneme" suggests "label-related", there is a fenemic Markov model corresponding to each label.

In speech recognition based on fenemic Markov models, each word is represented by a sequence of fenemic Markov models in the form of a word baseform. For a string of labels generated by an acoustic processor in response to a speech utterance, the fenemic Markov model sequence for each word is matched thereagainst to determine word likelihood.

Because labels are not readily discernible as are phonetic elements, constructing a word baseform of fenemic Markov models is not readily performed by a human. Instead, fenemic word baseforms are constructed automatically by computer. A simple approach is for a speaker to utter each word once and generate a string a labels by the acoustic processor. For successive labels in the string for a given word, the respective fenemic Markov models corresponding thereto are appended in sequence to form a fenemic Markov model baseform for the given word. Hence, if labels L1-L5-L10 - - - L50 are uttered, the fenemic Markov models $F_1F_5F_{10}$ - - - $F_{50}$ form the fenemic Markov model word baseform. This type of baseform is referred to as a "singleton baseform." The singleton baseform is not particularly accurate because it is based on only a single utterance of the subject word. A poor pronunciation of the word or a word which is subject to varying pronunciations renders the singleton baseform especially unsatisfactory.

To improve on the singleton baseform, a word baseform constructed from multiple utterances of a subject word has been proposed. Apparatus and methodology therefor is described in the co-pending parent application. In that application, word baseforms are constructed which are not only more accurate because based on multiple utterances, but also the word baseforms are constructed automatically without human intervention.

The parent application mentions that baseforms for word segments, as well as whole words per se, may be derived from multiple utterances according to that invention.

SUMMARY OF THE INVENTION

The present invention relates to apparatus and method for segmenting words and, based on multiple utterances, determining Markov model sequences for the segments. The Markov model sequences for successive segments of a word are concatenated to form the baseform for the entire word.

According to the invention, multiple utterances of a subject word are processed by an acoustic processor to form multiple strings of labels. One of the strings is selected as a prototype string (preferably based on string length). A singleton baseform of, preferably, fenemic Markov models is derived from the prototype string. The singleton baseform is then aligned against multiple strings generated for the subject word, other than the prototype string, each string being divided into successive substrings (of zero or more labels each). Each successive substring corresponds to a successive model in the singleton baseform. For each of the multiple strings, there is a substring aligned with a fenemic Markov model in the singleton baseform. The substrings aligned with a given fenemic Markov model are grouped. Each group represents a segment of the word. The substrings for a group are examined together to determine which fenemic Markov model or sequence of fenemic Markov models has the highest joint probability of generating the substrings in group. That fenemic Markov model or sequence of fenemic Markov models is assigned to the group and the segment of the word is represented thereby.

The fenemic Markov models or sequence of models for successive word segments are concatenated to form a word baseform. The process is repeated for one vocabulary word after another to obtain highly accurate word baseforms which are constructed automatically, without the need of or shortcomings which attend human intervention.

BRIEF DESCRIPTION OF THE DRWINGS

Figure 6A:
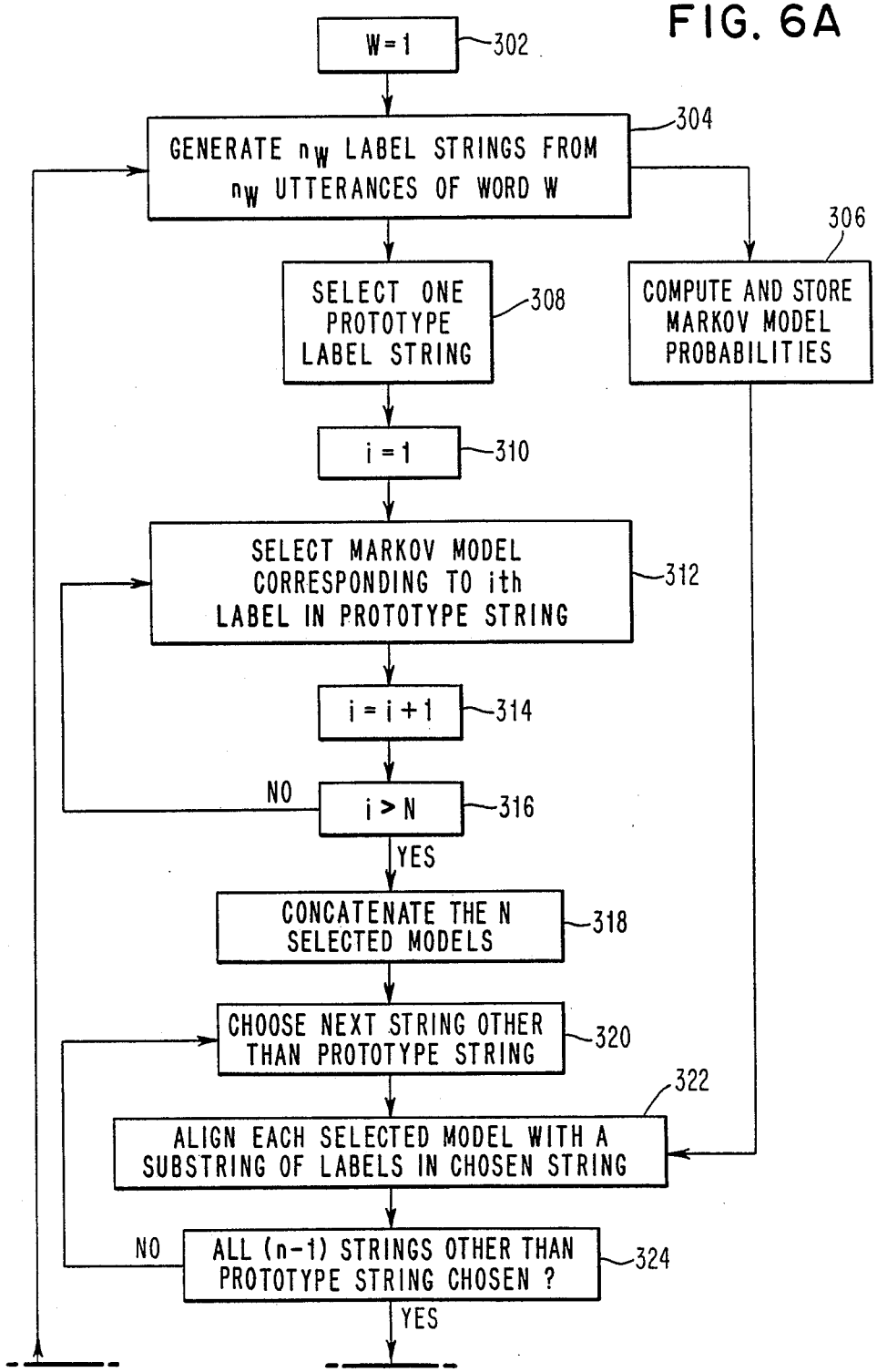
Figure 6B:
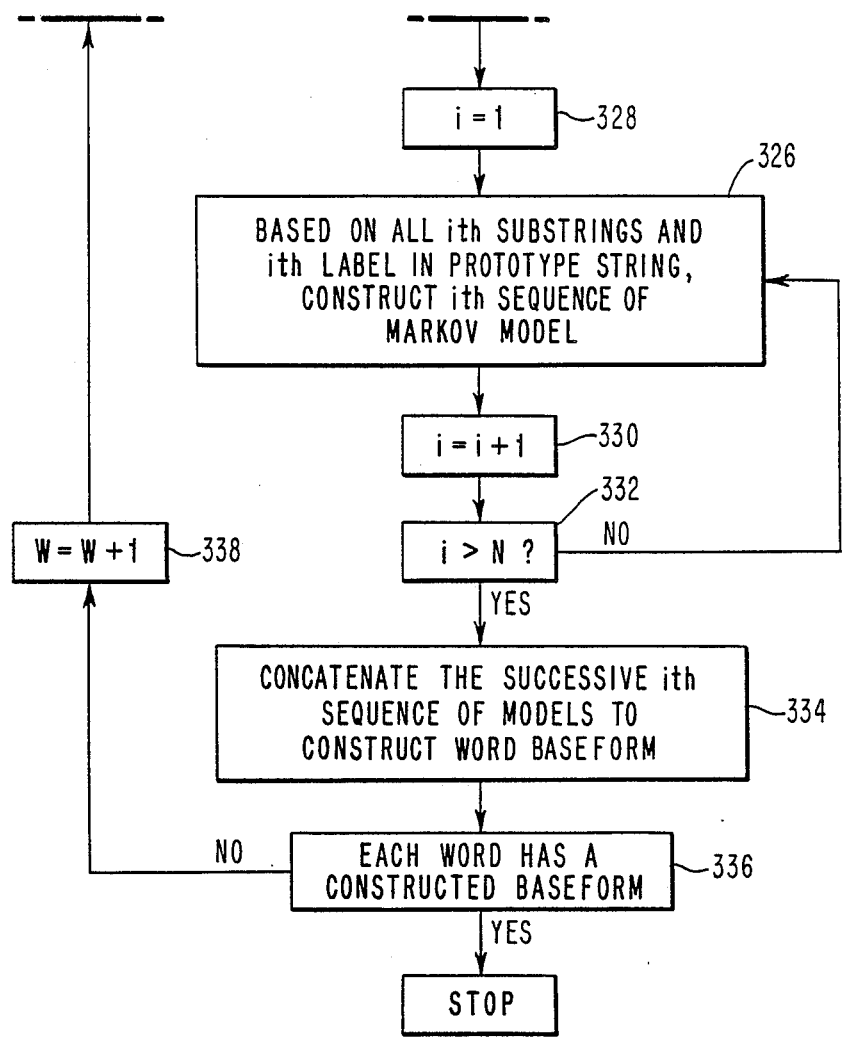
Figure 6:
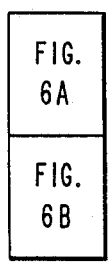

FIG. 6 (which includes parts FIGS. 6A and 6B) is a flowchart illustrating the methodology of the present invention.

Figure 7:
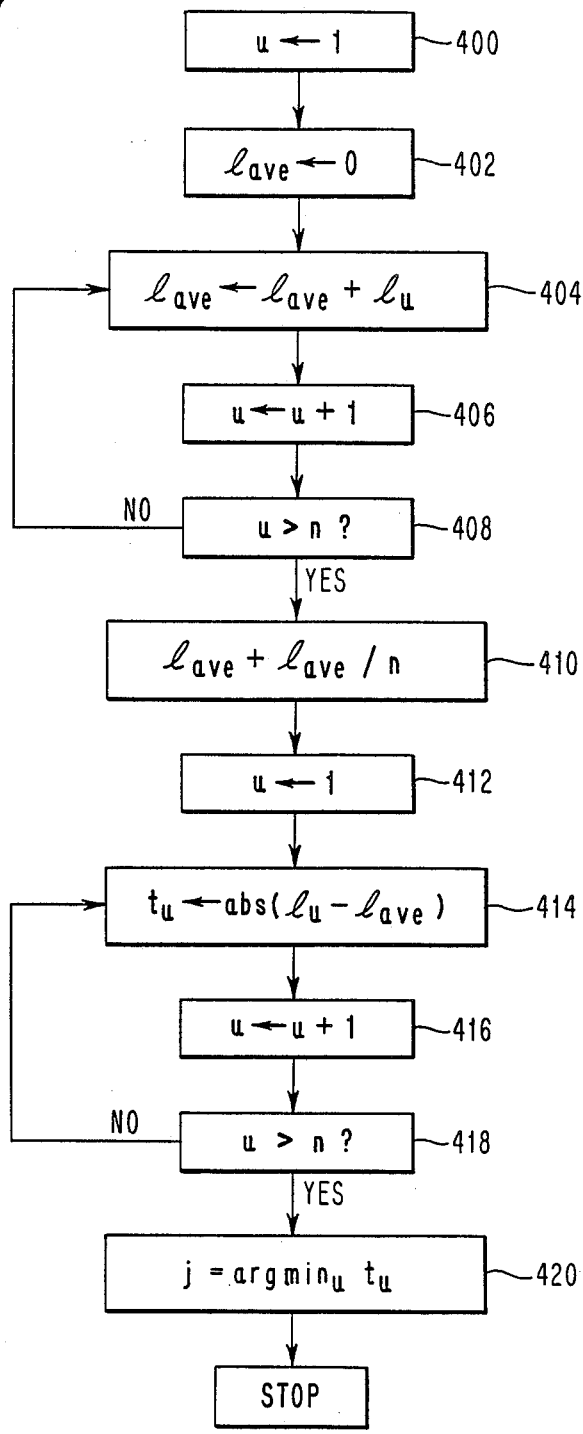

FIG. 7 is a flowchart showing, in detail, the steps included in selecting a prototype string.

Figure 8:
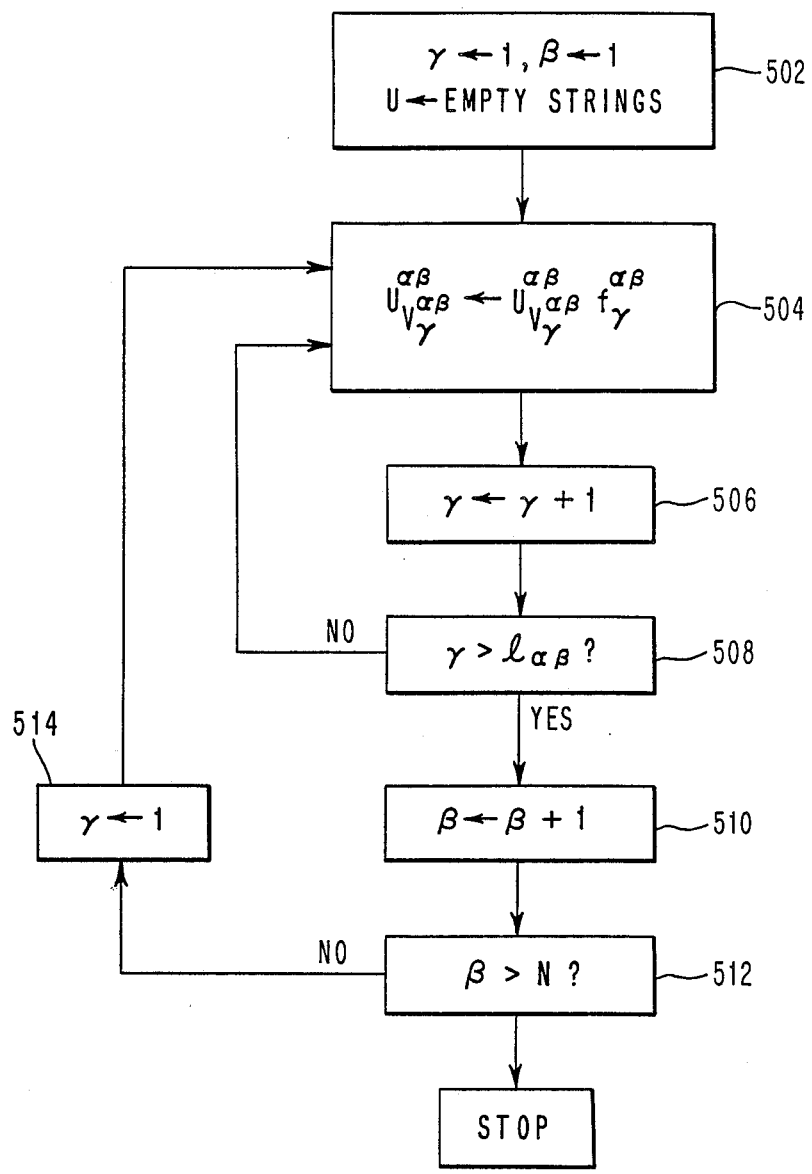

FIG. 8 is a flowchart illustrating, in detail, the grouping of substrings, each group being associated with a common segment of a word.

Figure 9A:
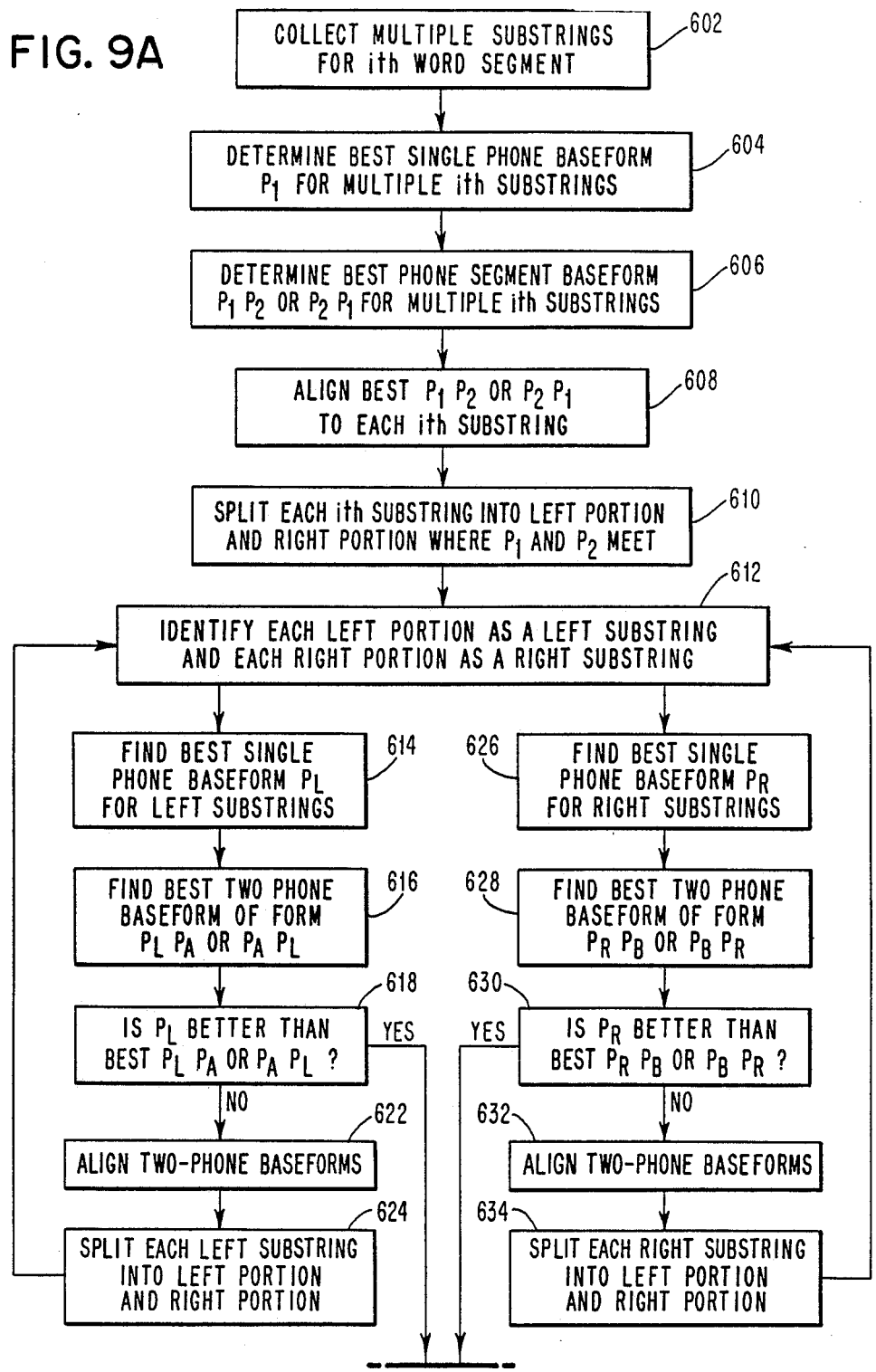

FIG. 9 (with parts FIGS. 9A and 9B) is a flowchart illustrating the method of determining the best Markov model or sequence of Markov models for each word segment.

DESCRIPTION OF THE INVENTION

Figure 1:
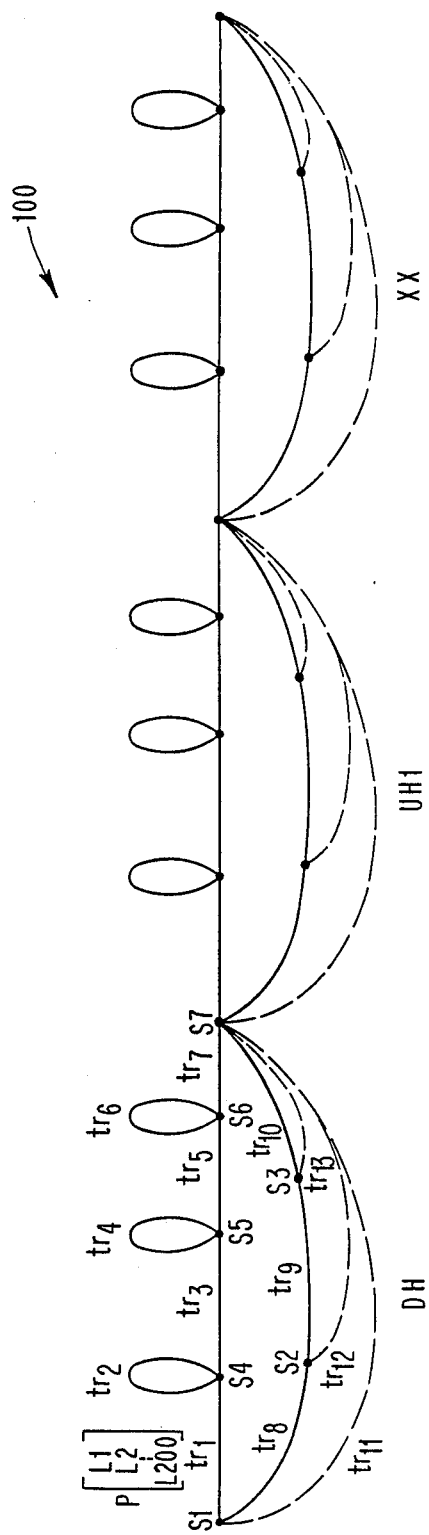
FIG. 1 is an illustration showing a phonetic Markov model word baseform employed in other Markov model speech recognizer processors.
Figure 2:
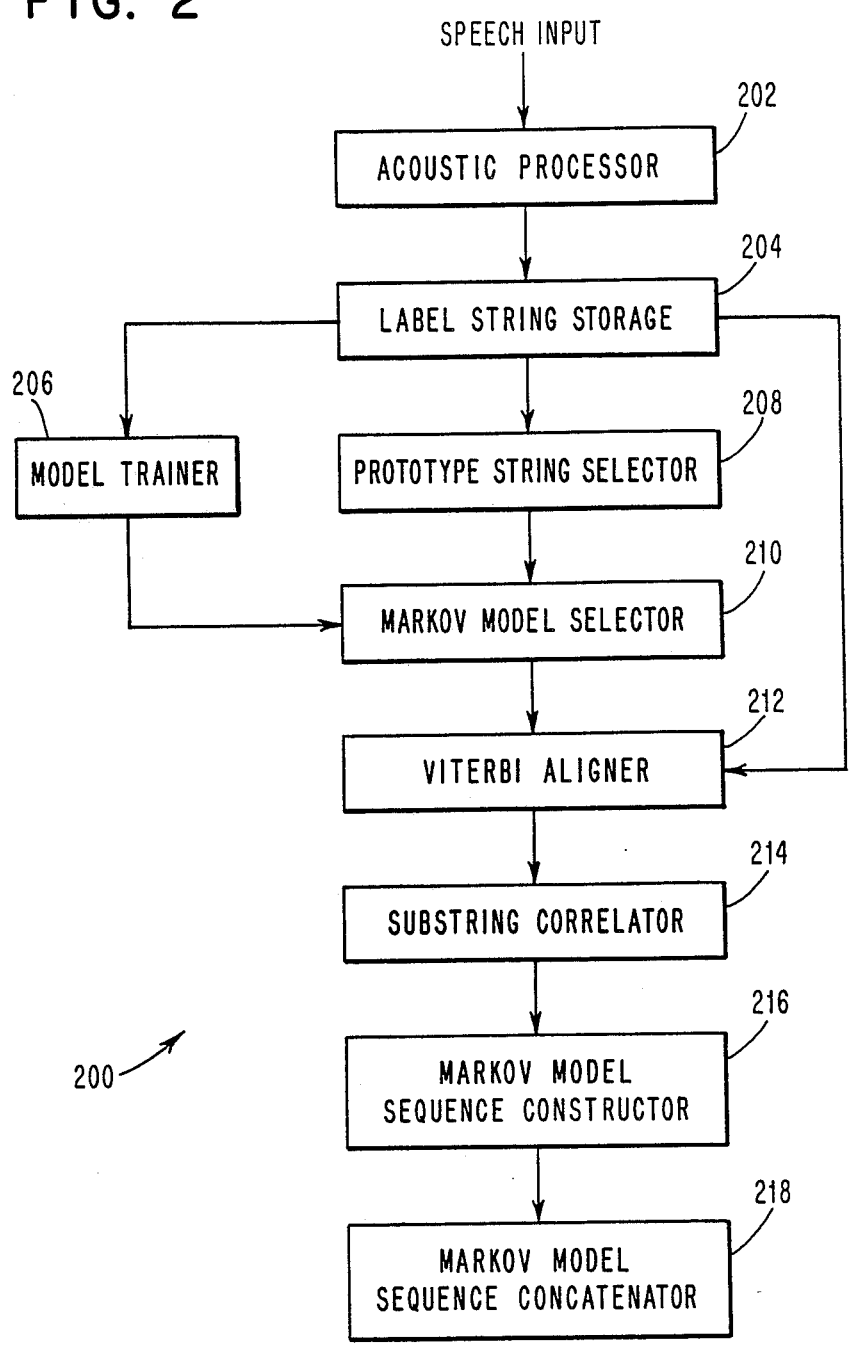
FIG. 2 is a block diagram showing the major elements of the present invention.

Referring to FIG. 2, a system 200 for representing words as respective sequences of Markov models is illustrated.

An acoustic processor 202 produces a string of "labels" in response to an uttered speech input. In particular, the acoustic processor 202 measures or computes amplitudes for a plurality of specified speech features. Each feature represents a vector component. With twenty features, the vector—styled as a "feature vector"—has twenty components. For successive intervals of time, successive feature vectors are generated by the acoustic processor 202. Stored in the acoustic processor 202 are an alphabet of prototype vectors; the alphabet typically including 200 prototype vectors. Each prototype vector represents a unique cluster of feature vectors. Each generated feature vector is assigned to a single cluster and is represented by a single prototype vector. Each prototype vector is identified by a "label'-'—such as L1, L2, L3, . . . or L200 or by some other identifier. The term "feneme" is used interchangeably with the term "label", the term "fenemic" meaning "label-related".

Figure 3:
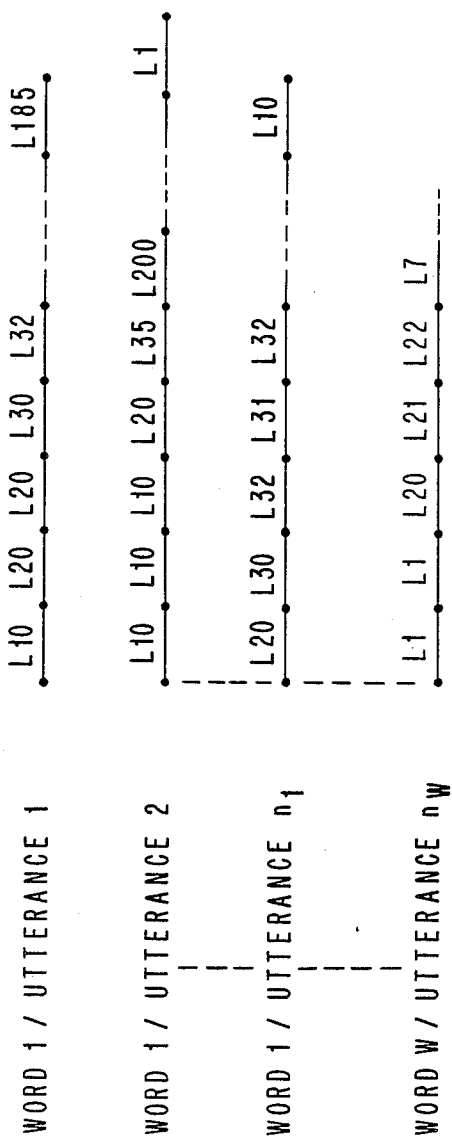
FIG. 3 is an illustration showing labels generated for multiple utterances of words.

In accordance with the invention, multiple utterances of a word are uttered into the acoustic processor 202. For each utterance, there is a corresponding string of labels which is stored in computer memory. This is shown in FIG. 3. For a first WORD1, a first utterance results in a corresponding string of labels: L1-L20-L20-L30-L32 - - - L185. Each label corresponds to a time interval which is preferably a centisecond; hence each string typically includes 60 to 100 labels. A second utterance of WORD1 results in the string of labels L10-L10-L10-L20-L35-L200 - - - L1. An $n_1$th utterance of WORD1 results in a corresponding string of labels L20-L30-L32-L31-L32 - - - L10. For the repeatedly uttered word WORD1, $n_1$ different strings of labels are generated. The strings differ because the measured features at the same time interval for each utterance may differ due to variations in speech speed, pronunciation, word context, noise, or other factors. The acoustic processor 202 repeats the process of generating multiple strings for each of numerous words in a vocabulary of words. In FIG. 3, this is shown by the illustrated string of labels which end with the $n_w$th utterance of a last word WORDW.

The multiple strings for each word enter label string storage 204 (of FIG. 2).

For each word in storage 204, a model trainer 206 specifies a sequence of fenemic Markov models for the word and determines arc probability values and label output probability values for each fenemic Markov model. Each fenemic Markov model is one of a finite set of fenemic Markov models.

Figure 4:
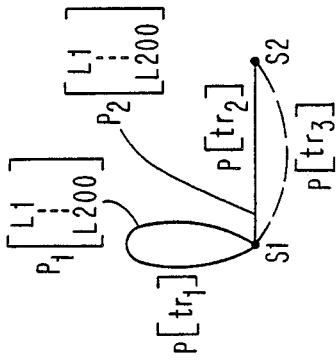
FIG. 4 is an illustration depicting a sample fenemic Markov model used in the present invention.

Preferably, each Markov model in the set corresponds to a label in the alphabet of labels. Such Markov models are referred to herein as "fenemic Markov models". Each fenemic Markov model preferably has a structure as shown in FIG. 4. That is, each fenemic Markov model has two states S1 and S2. Looping from S1 back to itself is a first transition—or arc—referred to as $tr_1$. Extending from S1 to S2 is a second transition—or arc—referred to as $tr_2$. A last transition—or arc—$tr_3$ also extends from S1 to S2, however represents a "null" transition. Unlike transitions $tr_1$ and $tr_2$ at which labels can be produced as outputs for the fenemic Markov model, transition $tr_3$ produces no label when it is followed. Each transition is allocated a transition probability—that is a likelihood of the transition being taken given that one is at state S1 of the Markov model. For each transition $tr_1$ and $tr_2$, there are also allocated label output probabilities. Each label output probability represents the likelihood of each label being produced during each transition. At the first transition $tr_1$, there is a group of 200 probabilities $$p_1 \begin{bmatrix} L1 \\ L2 \\ \cdot \\ \cdot \\ \cdot \\ L200 \end{bmatrix}$$

each corresponding to a label in the alphabet. Similarly, there are 200 label probabilities for transition $tr_2$. Because no label can be produced during a "null" transition, there are no label output probabilities for transition $tr_3$.

The probabilities for the fenemic Markov models are determined in the model trainer 206 by applying the well-known forward-backward algorithm, based on the statistics determined during a process referred to as "training". Briefly, a known training text is uttered by a speaker during a training session. The training text corresponds to a known sequence of fenemic Markov models (with initialized probability values.) A speaker utters the training text and an acoustic processor (like element 202) generates a string of labels in response to the uttered text. Each fenemic phone may occur numerous times in the training text. Counts are then made, each count indicating the number of times a given fenemic Markov model produces a given label. Each count takes into account all of the occurrences of the fenemic Markov model corresponding thereto. For example, if a fenemic Markov model $F_{10}$ occurs three times in the training text and, for the first occurrence, labels L10-L1-L10-L9 are produced; for the second occurrence, label L10 is produced; and for the third occurrence, labels L9-L11 are produced, the count of fenemic phone $F_{10}$ for label L10 will be $2+1+0=3$. By dividing the count for L10 by the counts of labels produced by fenemic Markov model $F_{10}$, a normalized value results—in this case, 3/7. From the counts, the fenemic Markov model probabilities are computed according the forward-backward algorithm. Details of the forward-backward algorithm are set forth in various publications such as "Continuous Speech Recognition by Statistical Methods" by F. Jelinek, *Proceedings of the IEEE*, volume 64, pp. 532–556 (1976) and "A Maximum Likelihood Approach to Continuous Speech Recognition", *IEEE Transactions on Pattern Analysis and Machine Intelligence*, volume PAMI-5, Number 2, March 1983, by L. R. Bahl, F. Jelinek, and R. L. Mercer, which are incorporated herein by reference and are outlined in a co-pending patent application entitled "Improving the Training of Markov Models Used In a Speech Recognition System" by Bahl et al., Ser. No. 845,201 filed Mar. 27, 1986.

One of the label strings is selected as a prototype string by a selector 208. Preferably, the prototype string selector 208 selects, for a subject "WORDw", the stored label string having a length closest to the average length of all strings generated for the word "WORDw". The prototype string enters a Markov model selector 210. Based on the probabilities of each fenemic Markov model, the fenemic Markov model corresponding to each respective label in the prototype string is selected. For example, if the prototype string includes the labels L10-L20-L20-L30-L32 - - - L185 (see first utterance of WORD1 in FIG. 3), the successively selected fenemic Markov models are $F_{10}$-$F_{20}$-$F_{20}$-$F_{30}$-$F_{32}$ - - - $F_{185}$. The concatenation of successive fenemic Markov models is referred to as a "singleton word baseform" WORDw in that each label in only one string is correlated one-to-one with a corresponding Markov model.

According to the invention, the sequence of Markov models for the singleton baseform is correlated against the labels in each string—other than the prototype string—stored for the subject word WORDw. The correlation is performed by a Viterbi algorithm aligner 212. The Viterbi algorithm aligner 212 operates to align successive substrings in each stored string to successive Markov models in the singleton baseform. This is illustrated in FIG. 5 for WORD1 of FIG. 3, with the prototype string corresponding to the first utterance.

Figure 5:
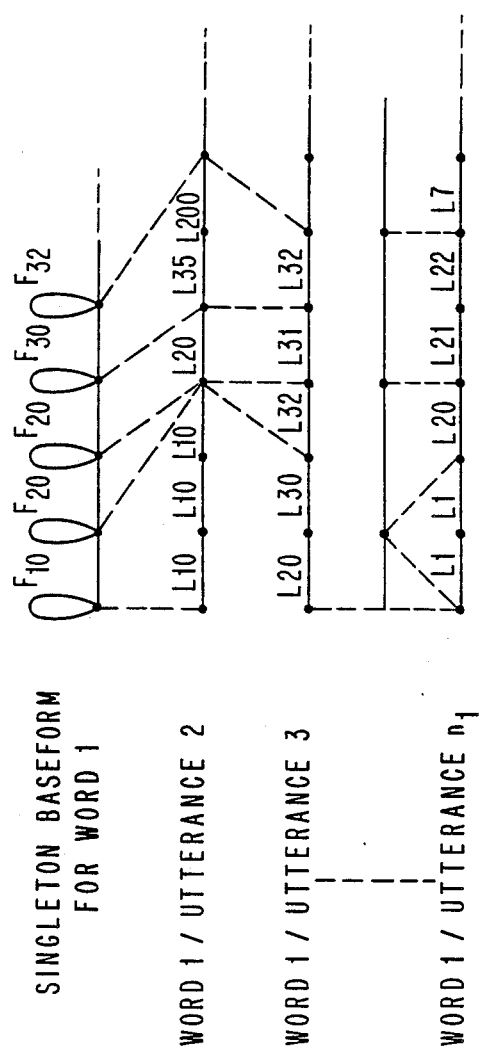
FIG. 5 is an illustration showing the alignment of a singleton baseform derived from one utterance of a word against each label string corresponding to other respective utterances of the word.

In FIG. 5, the fenemic Markov models comprising the singleton word baseform—based on the first utterance of WORD1—include $F_{10}$-$F_{20}$-$F_{20}$-$F_{30}$-$F_{32}$ - - - . According to the well-known Viterbi alignment algorithm, the labels in the string corresponding to the second utterance of WORD1 are aligned with the fenemic Markov model in the singleton baseform. Based on the probabilities stored for the fenemic Markov models, it is determined that the first three labels align with the fenemic Markov model $F_{10}$. The next fenemic Markov model produces no labels in the string for the second utterance. The third fenemic Markov model $F_{20}$ is aligned with the label L20. The fourth fenemic Markov model, $F_{30}$, is aligned with labels L35 and L200 of the string corresponding to the second utterance. The alignment extends through the labels in the second utterance. For the second utterance, it is observed that the string has been divided into a sequence of substrings where each ith substring (of zero, one, or more labels) corresponds to successive ith fenemic Markov models in the singleton word baseform.

Still referring to FIG. 5, it is observed that the third utterance is also aligned against the fenemic Markov models $F_{10}$-$F_{20}$-$F_{20}$-$F_{30}$-$F_{32}$ - - - . As with the second utterance, the string corresponding to the third utterance is divided into a sequence of substrings—each corresponding to one of the fenemic Markov models.

The first substring (i=1) includes label L20 followed by label L30; the second substring includes label L32; the third substring includes label L31; the fourth substring includes the label L32; and so on.

The last utterance of WORD1 results in the substrings: no labels for the first substring; label L1 followed by label L1 for the second substring; label L20 for the third substring; label L21 followed by label L22 for the fourth substring; label L7 for the fifth substring; and so on.

The substrings serve to partition the string (and the utterances corresponding thereto) into common segments. That is, the ith substring in each string represents the same segment of WORD1. A substring correlator 214 groups the first substrings i=1 for the $n_1$ strings; the second substrings (i=2) for the $n_1$ strings; and so on. In general, the ith substrings for the $n_1$ strings are grouped by the substring correlator 214.

Based on the substrings in each group, a Markov model sequence constructor 216 determines one or more Markov models in sequence which have the best joint probability of producing a group of substrings. For example, referring again to FIG. 5, the first group of correlated substrings includes L10-L10-L10; L20-L30; . . . ; and no labels. A fenemic Markov model or a sequence of fenemic Markov models is determined which has the best joint probability of producing the respective substrings. The determined model or sequence of models is associated with the first common segment of the subject word. The same operation is performed for the second group of correlated substrings, resulting in a model or sequence of models associated with the second common segment of the subject word. The operation is repeated for successive groups until all common segments of the subject word have a model or sequence of models associated therewith.

The fenemic Markov models constructed for each successive group are concatenated by a Markov model sequence concatenator 218 to form a word baseform for the subject word. The word baseform constructed by the concatenator 218 for the subject word is based on the multiple utterances and is significantly improved over the singleton word baseform. As discussed below with reference to the flowchart of FIG. 6, one word after another in the vocabulary can be processed by the system 200 so that each vocabulary word has constructed therefor a word baseform derived from Markov models or sequences of Markov associated with word segments determined for multiple utterances.

Referring to FIG. 6, the method of operation of the system 200 is outlined. In step 302, a word index value w is set to 1 for the first word in the vocabulary. For the first word, $n_w$ strings are generated by the acoustic processor 202 (of FIG. 3) from $n_w$ utterances of the first word (step 304). In step 306, Markov model probabilities and related statistics are computed and stored, based on the labels generated in step 304. In step 308, a prototype string is selected from the $n_w$ strings for the WORDw. As noted hereinabove, the prototype string is preferably the string closest to the average string length, although other strings—such as the shortest string—may be defined as the prototype string.

For the average length string as the prototype string, FIG. 7 illustrates methodology for determining the average length string from among the multiple strings for a subject word. In FIG. 7, $l_u$ is the length of the uth utterance, n is the number of utterances, and j is an identifier for the average length string. Steps 402 and 404 pertain to initializing values. Value $l_{ave}$ is repeatedly up-dated (starting initially at zero) by adding the lengths of successive utterances until string lengths for all of the utterances have been summed (steps 404, 407, and 408). The average length is found by dividing the sum by n (step 410). The string lengths are compared to the average one after another, the string with the smallest variation from the average being selected (see steps 412 through 420).

Referring again to FIG. 6, a label index i is initialized to 1 in step 310. (It is noted that index values such as i and j may count different events in different portions of this description). In steps 312 through 316, the Markov model corresponding to one ith label of the prototype string after another is selected. Assuming there are N labels in the prototype string, the N fenemic Markov models corresponding thereto are concatenated (step 318) to form a singleton word baseform. A string other than the prototype string is chosen in step 320. The string chosen in step 320 is aligned against the Markov models in the singleton word baseform (step 322) by Viterbi alignment, so that for each successive Markov model in the singleton word baseform there is a corresponding substring of labels for the string currently chosen in step 320. Steps 320 and 322 are repeated for one stored label string after another (step 324).

Steps 320 through 324 are illustrated in greater detail in FIG. 8. In FIG. 8, "$f_k{}^{an}$" is defined as the kth label of the nth utterance for the ith word. "$l_{an}$" is defined as the number of labels associated with the nth utterance of the $a$th word in a text of uttered words. "$d_a$" is defined as the number of fenemic Markov models associated with the $a$th word in a text of uttered words. "$v_k{}^{an}$" is defined as the mapping of the kth label of the nth utterance of the $a$th word to a Markov model, in a text of uttered words where $l_{an} \geq k \geq 1$, $d_a \geq v_k{}^{an} \geq 1$. In FIG. 8, k and n are initialized to one and all strings U are initialized to be empty strings (step 502). Each string $$U^{an}_{v_k{}^{an}}$$

is up-dated by concatenating one label after another thereto until all labels in the utterance have been concatenated (steps 504 through 508). For example, if there are 14 labels in the nth utterance, and the first three labels are mapped to a first model; the next ten labels are mapped to a second model; and the last label is mapped to a third model. Step 504 up-dates $U^{an}$ as mapped to the first model by appending the first label thereto. After appending the first label, the second label is appended, and thereafter the third label is appended. The next cycle from step 508 to step 504 applies to a new (empty) string associated with the second model. The fourth label in the string is added to the empty string to form an up-dated string. In succession, the fifth, sixth, seventh, . . . , and fourteenth labels are appended. A next (empty) string for the third Markov model is then up-dated by appending the fourteenth label to the empty string. After the fourteenth (last) label in the nth utterance, n is incremented in step 510 so that the next utterance may be processed. Each utterance is processed starting with the first label and ending with the last label thereof (steps 512 and 514).

Accordingly, all (n−1) strings—i.e., the strings other than the prototype string—are divided into successive substrings wherein each ith substring has a length of zero or more labels and corresponds to a common segment of the WORDw. The respective fenemic Markov model or sequence of fenemic Markov models which has the highest joint probability of producing all of the ith substrings is constructed (steps 326 through 332). That is, the substrings for one common segment after another are processed to determine respective models or model sequences therefor.

The preferred method of determining the Markov model or sequence of Markov models which correspond to each group of ith substrings is discussed in detail in the co-pending parent application cited above.

In FIG. 9, a divide-and-conquer approach—discussed in the above-mentioned parent application—is employed to derive a refined segment baseform for a given ith common segment in a subject word. The steps of FIG. 9 are now outlined. In the flowcharge of FIG. 9, it is noted that the term "phone" or "phone machine" refers to a Markov model.

With the set of phones (i.e., Markov models) defined, a determination is made as to which phone provides the best baseform of phone length 1 when applied to all the ith substrings corresponding to the ith common segment (steps 602 and 604). The best baseform of phone length 1 (referred to as $P_1$) is found by examining each phone in the set and, for each phone, determining the probability of producing each ith substring. The n probabilities derived for each particular phone are multiplied together (by a processor of the sequence constructor 216 of FIG. 2) to yield a joint probability assigned to the particular Markov model, or phone. The phone having the highest joint probability is selected as the best baseform $P_1$ of length 1.

Keeping phone $P_1$, the best baseform of length 2 having the form of $P_1P_2$ or $P_2P_1$ is sought in step 606. That is, each phone of the set is appended at the end of $P_1$ and forward of $P_1$ and a joint probability for each ordered pair of phones is derived. The ordered pair having the highest joint probability of producing the feneme strings is considered the best.

In step 608, the best baseform of length 2, i.e., the ordered pair of highest joint probability, is then subjected to alignment, such as the well-known Viterbi alignment. Briefly, the alignment indicates which labels in each ith substring correspond to each phone of the ordered pair.

Following alignment, a consistent point is located in each ith substring. For each ith substring, the consistent point is defined as the point where phones $P_1$ and $P_2$ (of the best baseform of length 2) meet. Alternatively, the consistent point may be viewed as the point where each ith substring is divided into a left portion aligned with the left phone and a right portion aligned with the right phone, wherein the left portions of all the ith substrings represent a common segment of the word and wherein the right portions of all the ith substrings represent a common segment of the word (see step 610).

In step 612, the left portions and the right portions are then treated separately but similarly as "left substrings" and "right substrings" respectively, to which the divide-and-conquer approach is then applied.

For the left substrings, the best single phone baseform $P_L$ is found (step 614). Keeping the phone $P_L$, each phone in the set is appended therebefore and thereafter to form ordered phone pairs. The ordered pair $P_L$ and $P_A$ or $P_A P_L$ having the highest joint probability of producing the labels in the left substrings is then found (step 616). As suggested previously, this represents the best baseform of length 2 for the left substrings.

The joint probability of the best baseform of length 2 for the left substrings is compared to the joint probability of $P_L$ alone (step 618). If the $P_L$ joint probability is greater, the phone $P_L$ is positioned in a concatenated baseform (step 620). If the $P_L$ joint probability is less in step 618, $P_L P_A$ or $P_A P_L$ is aligned against the left substrings (step 622). A consistent point in the left substrings is located and each left substring is split thereat into a (new) left portion and a (new) right portion (step 624).

The same procedure is also applied to the each right portion of the initially split ith substrings. A single best baseform $P_R$ (step 626) is compared against the best baseform $P_R P_B$ or $P_B P_R$ of phone length 2 (steps 628 and 630). If the joint probability of $P_R$ is greater, the phone $P_R$ is positioned in the concatenated baseform (step 620). Otherwise, alignment is performed and each right substring is split at the consistent point thereof (steps 632 and 634).

The division cycle is repeated for each left substring and right substring in which the best baseform of length 2 has a higher joint probability than the best single phone baseform. A point is reached when only best single phones remain. The best single phones are concatenated in step 620.

The single phone baseforms are concatenated in the same order as the substrings they represent. The concatenated baseform represents a basic word segment baseform.

A refinement of the basic concatenated baseform is provided. According to the refinement, the basic concatenated baseform is aligned against the original ith substrings (step 640). The ith substrings are partitioned where the phones—i.e., Markov models—meet (step 642). For each partition, a "new" best phone is determined in step 644. That is, given the probabilities of each phone, the phone having the highest probability of producing the labels in the partition is determined in a known manner. Because of the alignment, the best single phone for labels in a partition may differ from the single phone in the previously aligned concatenated-baseform. If the "new" best phone is just the same as the phone in the concatenated baseform (step 646), it is positioned by the processor of the sequence constructor 216 of FIG. 2 into a refined word segment baseform (steps 648). If the new best phone differs from the phone in the previous concatenated baseform, the new best phone replaces the previous phone in the basic concatenated baseform (step 648) and steps 640 through 646 are repeated. When step 646 results in only "YES" outputs for all partitions, the resulting phones are concatenated into a refined word segment baseform (step 652).

In step of FIG. 6, the fenemic Markov model or sequence of fenemic Markov models constructed for each ith common segment are concatenated to form a word baseform.

Through steps 336 and 338, word baseforms are constructed pursuant to step 304 through 334 for successive words in the vocabulary.

In operation, the word baseforms are stored in computer memory as a sequence of fenemic Markov models. For example, a word may be stored as the sequence $F_5$-$F_{10}$-$F_{10}$---. Also stored in memory are the probabilities for each fenemic Markov model:

---

Markov Model Probability Storage

```
            -continued

Model F₅
    State S1
        Arc tr1
            Arcprob
            L1prob
            L2prob
            L3prob
              .
              .
              .
            L200prob
        Arc tr2
            Arcprob
            L1prob
            L2prob
            L3prob
              .
              .
              .
            L200prob
        Arc tr3
            Arcprob
Model F₆
    .
    .
    .
Model F₁₀
    State S1
        Arc tr1
            Arcprob
            L1prob
            L2prob
            L3prob
              .
              .
              .
            L200prob
        Arc tr2
            Arcprob
            L1prob
            L2prob
            L3prob
              .
              .
              .
            L200prob
        Arc tr3
            Arcprob
    .
    .
    .
Model F₂₀₀
    State S1
        Arc tr1
            Arcprob
            L1prob
            L2prob
            L3prob
              .
              .
              .
            L200prob
        Arc tr2
            Arcprob
            L1prob
            L2prob
            L3prob
              .
              .
              .
            L200prob
        Arc tr3
            Arcprob
```

With stored probabilities for the fenemic Markov models and word baseforms determined in accordance with the present invention, speech recognition is performed by acoustic matching the word baseforms to generated labels, in a manner as discussed in the aforementioned patent application "Speech Recognition System". Hardware description:

The baseform growing procedure has been implemented on an IBM 3090 mainframe in the PLI language with the following memory requirements:

| | |
|---|---|
| Hidden Markov Model Statistics storage | 200 Kilobytes |
| Label storage | 10 bytes/label → 1 kilobyte per word. For a 20000 word vocabulary with 10 utterances per word, requires 200 Megabytes of storage. |
| Singleton fenemic baseforms | 1 Kilobyte/baseform. For a 20000 word vocabulary, requires 20 Megabytes. |

While the present invention has been described in terms of preferred embodiments thereof, it will be understood by those skilled in the art that various changes in form and details may be made without departing from the scope of the invention. For example, the sample structure for the fenemic Markov model may differ from that shown in FIG. 4.

We claim:

1. In a Markov model speech recognition system having an acoustic processor which generates a string of labels in response to an uttered input where each label is one of an alphabet of labels, a computerized method of constructing Markov model word baseforms comprising the steps of:

(a) for each of a set of Markov models in which each Markov model corresponds to a respective label and in which each Markov model has (i) a plurality of states and (ii) a plurality of arcs wherein each arc extends from a state to a state, computing and storing in computer memory arc probabilities and label output probabilities wherein each label output probability represents the likelihood of a given label being produced at a given arc;

(b) generating, with the acoustic processor, n respective strings of labels in response to each of n utterances of a subject word selected from a vocabulary of words;

(c) selecting the string of labels having a length which is closest to the average length of all strings generated in step (b);

(d) concatenating in sequence the Markov models which correspond to the successive labels in the selected string and storing the concatenated sequence;

(e) for a string other than the selected string, aligning successive substrings of zero or more labels against successive Markov models in the concatenated sequence, based on the stored probabilities;

(f) repeating step (e) for each generated string of step (b) other than the selected string, each string generated in step (b) having a respective substring corresponding to each Markov model in the concatenated sequence of step (d);

(g) partitioning the generated strings of step (b) into successive common segments, the ith common segment of each string corresponding to the i th substring thereof; and (h) constructing a sequence of one or more Markov models for each ith common segment based on the ith label of the prototype string and the ith substrings of the other strings.

2. The method of claim 1 comprising the further steps of:
   (j) concatenating the respective constructed sequences of Markov models for the successive common segments of the subject word to form a word baseform; and
   (k) repeating steps (a) through (j) for each word in the vocabulary.

3. The method of claim 2 wherein step (h) includes the steps of:
   (l) for each ith common segment, (i) locating a consistent point in each ith substring corresponding thereto and (ii) dividing each substring at the consistent point thereof into a left portion and a right portion.

4. The method of claim 3 wherein step (l) includes the steps of:
   (m) determining, from the stored probabilities, the Markov model having the highest joint probability of producing the ith label of the prototype string and the ith substrings of all the other strings;
   (n) appending a Markov model in front of the determined Markov model to form an ordered pair of Markov models and computing, based on the stored probabilities, the probability of the ordered pair of Markov models producing the ith label of the prototype string and the each of the ith substrings of the other strings;
   (o) repeating step (n) for each Markov model in the set as the appended Markov model;
   (p) appending a Markov model at the end of the selected Markov model to form an ordered pair of Markov models and computing, based on the stored probabilities, the probability of the ordered pair of Markov models producing the i th label of the prototype string and the each of the ith substrings of the other strings;
   (q) repeating step (p) for each Markov model in the set as the appended Markov model;
   (r) selecting the ordered pair of the appended Markov model and the selected Markov model that has the highest joint probability of producing the ith label of the prototype string and the each of the ith substrings of the other strings; and
   (s) performing an alignment process between the selected ordered pair of Markov models and each ith substring, the point in each substring where the two Markov models meet being the consistent point.

5. The method of claim 4 comprising the further steps of:
   (t) splitting the left portion from the right portion of each ith substring at the respective consistent point thereof;
   (u) finding the single Markov model $P_L$ having the highest joint probability for the left portions of the ith substrings;
   (v) finding the two-model sequence, from among all two-model sequences that include the Markov model $P_L$, which has the highest joint probability of producing the left portions;
   (w) if the highest probability two-model sequence of step (v) is higher than the probability associated with the single phone $P_L$, (i) aligning each ith substring against the found two-model sequence and (ii) splitting the found two-model sequence apart at the point of meeting into a resultant left portion and a resultant right portion; and
   (x) performing steps (t) through (w) with the resultant left portion and the resultant right portion being substituted for the left portion and the right portion respectively.

6. The method of claim 5 comprising the further steps of:
   (y) discontinuing the splitting when a highest probability single Markov model has a higher probability than any two-model sequence that includes the highest probability single Markov model and an appended Markov model; and
   (z) concatenating the unsplit single Markov models, the concatenated unsplit Markov models representing a basic baseform for the i th segment of the subject word.

7. The method of claim 6 comprising the further steps of:
   (aa) aligning each ith substring against the baseform of concatenated unsplit single Markov models; and
   (bb) for a Markov model in the concatenated baseform, determining the labels which are aligned thereagainst and either (i) if there are no aligned labels, deleting the Markov model from the concatenated baseform or (ii) if there are aligned labels, finding the Markov model which maximizes the probability of producing the determined labels; and
   (cc) replacing the Markov model in the concatenated baseform by the found phone if they differ; and
   (dd) repeating step (cc) for each Markov model in the concatenated basic baseform of the i th segment of the subject word.

8. The method of claim 7 comprising the further step of:
   (dd) repeating steps (aa), (bb), and (cc) until each Markov model in the concatenated baseform has the maximum probability of producing the labels aligned therewith;
the baseform resulting from step (dd) being a refined baseform for the word segment.

9. In a speech recognition system, a computerized method used in determining Markov model sequences for words in a vocabulary based on multiple utterances of each word, the method comprising the steps of:
   (a) generating, from an acoustic processor which assigns one of an alphabet of speech-type labels to each successive interval of speech, a respective string of labels for each utterance of a subject word;
   (b) storing the respective strings in computer memory; and
   (c) partitioning the generated strings for each utterance of the subject word into successive word segments;
   wherein step (c) includes the steps of:
   (d) computing and storing arc probabilities and label output probabilities for each of a set of Markov models, wherein each Markov model in the set corresponds to a respective label;
   (e) retrieving from storage the generated string corresponding to a prototype utterance for a subject word;
   (f) selecting the one Markov model after another in sequence which corresponds to the respective one label after another generated by the acoustic processor for the prototype utterance;
   (g) aligning each Markov model for the prototype utterance against labels generated for another utterance of the subject word, wherein the successive Markov models for the prototype utterance are aligned against successive substrings for said other utterance based on the stored probabilities; and (h) repeating step (g) for each utterance other than the prototype utterance;

the ith label of the prototype string and the ith substring of each other string representing the ith segment of each respective utterance.

10. The method of claim 9 further comprising the step of:

(i) constructing a single sequence of Markov models applicable to each ith segment corresponding to each utterance (where $1 \leq i \leq N$, where N is the total number of segments into which the subject word is partitioned);

which includes the steps of:

(j) where phonelength corresponds to the number of Markov models in sequence, finding a one-model best first baseform $P_L$ of phonelength 1 which maximizes the joint probability of producing the substrings resulting from multiple utterances of a given word in a vocabulary of words;

(k) finding a two-model best second baseform of phonelength 2 and of the form either (i) $P_L P_2$ or (ii) $P_2 P_L$ which has a higher joint probability than any other baseform of length 2;

(l) iteratively comparing the joint probability of the found best first baseform with the joint probability of the found best second baseform and, if the found best second baseform joint probability is higher than the joint probability of the found best first baseform, splitting each label string into a left portion and a right portion at the point which maximizes the probability that the left portion is produced by the left model and the right portion is produced by the right model;

(m) repeating steps (j) through (l) until all baseforms are of single phonelength and no found best second baseform has a higher probability than its respective found best first baseform;

(n) after step (m), concatenating the baseforms of phonelength 1 to form a basic baseform of the ith word segment.

11. The method of claim 10 comprising the further steps of:

(o) aligning the concatenated baseform against the ith substrings using the Viterbi algorithm and identifying a group of labels in each i th substring which corresponds to each Markov model in the concatenated baseform for the ith word segment; and (p) after step (o), replacing, in memory containing the baseform, any Markov model in the concatenated baseform by any other Markov model in the set having a higher joint probability of producing the label groups in the multiple ith substrings.

12. The method of claim 11 comprising the further steps of:

(q) concatenating the respective single sequences for successive segments in order to form a sequence of Markov models for the subject word; and (r) repeating steps (a) through (q) for one word after another in a vocabulary of words.

13. The method of claim 12 wherein step (d) includes the steps of:

(s) selecting one of the strings for a given word and constructing a preliminary baseform of the given word formed of the sequence of fenemic Markov models corresponding to the labels in the selected string; and (t) computing arc probabilities and label output probabilities for the fenemic Markov models.

14. The method of claim 9 wherein step (d) includes the steps of:

(u) selecting one of the strings for a given word and constructing a preliminary baseform of the given word formed of the sequence of fenemic Markov models corresponding to the labels in the selected string;

(v) computing arc probabilities and label output probabilities for fenemic Markov models based on the labels generated for all strings other than the selected one string of step (u).

15. The method of claim 9 wherein step (c) includes the steps of:

(w) grouping substrings corresponding to one Markov model in the singleton baseform after another, each group corresponding to a common segment of the subject word;

(x) determining the best single Markov model $P_1$ for producing the substrings in an ith group;

(y) determining the best two model baseform of the form $P_1 P_2$ or $P_2 P_1$ for producing the substrings in the ith group;

(z) aligning the best two model baseform against each substring in the ith group;

(aa) splitting each substring of the ith group into a left portion and a right portion with the left portion corresponding to the first Markov model of the two phone baseform and the right portion corresponding to the second Markov model of the two phone baseform;

(bb) identifying each left portion as a left substring and each right portion as a right substring;

(cc) processing the set of left substrings in the same manner as the set of substrings in the ith group including the further step of inhibiting further splitting of a substring when the single model baseform thereof has a higher probability of producing the substring than does the best two model baseform;

(dd) processing the set of right substrings in the same manner as the set of substrings in the ith group including the further step of inhibiting further splitting of a substring when the single model baseform thereof has a higher probability of producing the substring than does the best two model baseform;

(ee) concatenating the unsplit single models in an order corresponding the order of the groups to which they correspond;

(ff) aligning the concatenated baseform against each of the substrings for the ith group and identifying, for each model in the concatenated baseform, the substring in each substring of the ith group which corresponds thereto, the substrings corresponding to a given model being a set of common substrings;

(gg) for each set of common substrings, determining the Markov model having the highest joint probability of producing the common substrings;

(hh) for each common substring, replacing the model therefor in the concatenated baseform by the determined model of highest joint probability; and repeating steps (ff) through (hh) until no models are replaced.

16. Apparatus for constructing a Markov model word baseform for a word in a vocabulary from multiple utterances thereof comprising:

acoustic processor means for generating a string of labels in response to an uttered speech input;

means, coupled to receive label string outputs from the acoustic processor means, for storing labels for multiple strings of labels generated by the acoustic processor in response to multiple utterances of a subject word;

means for retrieving a prototype string from among the stored strings for the subject word;

means, coupled to receive as input a retrieved prototype string, for forming a singleton word baseform for the retrieved prototype string;

means, coupled to retrieve label strings from the label string storing means and coupled to the singleton baseform forming means, for aligning the labels in strings other than the selected prototype string against the singleton baseform, each string being divided into successive substrings respectively aligned against successive fenemic Markov models in the singleton baseform; and correlator means, coupled to receive input alignment data from the aligning means, for grouping the ith substrings of the multiple strings;

each group of ith substrings corresponding to a common word segment.

17. Apparatus as in claim 16 further comprising:

model constructor means for determining the fenemic Markov model or fenemic Markov model sequence having the highest joint probability of producing the labels in a group of substrings formed by the correlator means.

18. Apparatus as in claim 17 further comprising:

training means for computing arc probabilities and label output probabilities for each fenemic Markov model including:

means for choosing any string of labels generated for the subject word;

means, coupled to the string choosing means, for forming a preliminary sample baseform from said any chosen string; and means, coupled to the sample baseform forming means and the storing means, for computing arc probabilities and label output probabilities.

* * * * *